US009718985B2

(12) United States Patent
Maeda et al.

(10) Patent No.: US 9,718,985 B2
(45) Date of Patent: Aug. 1, 2017

(54) METHOD FOR COATING PIPE WITH ACID-CURABLE RESIN AND ACID CURING AGENT

(71) Applicant: SUMITOMO BAKELITE CO., LTD., Tokyo (JP)

(72) Inventors: Fumihiro Maeda, Tokyo (JP); Yasushi Arita, Tokyo (JP)

(73) Assignee: SUMITOMO BAKELITE CO., LTD., Tokyo (JP)

(*) Notice: Subject to any disclaimer, the term of this patent is extended or adjusted under 35 U.S.C. 154(b) by 0 days.

(21) Appl. No.: 15/111,007

(22) PCT Filed: Jan. 8, 2015

(86) PCT No.: PCT/JP2015/050309
§ 371 (c)(1),
(2) Date: Jul. 12, 2016

(87) PCT Pub. No.: WO2015/107966
PCT Pub. Date: Jul. 23, 2015

(65) Prior Publication Data
US 2016/0340543 A1  Nov. 24, 2016

(30) Foreign Application Priority Data

Jan. 14, 2014  (JP) .................................. 2014-003845

(51) Int. Cl.
| *B05D 7/22* | (2006.01) |
| *C09D 161/06* | (2006.01) |
| *B05D 3/10* | (2006.01) |
| *F16L 57/00* | (2006.01) |
| *C09D 161/02* | (2006.01) |
| *C09D 161/04* | (2006.01) |
| *C09D 161/34* | (2006.01) |
| *C09D 161/16* | (2006.01) |
| *C09D 161/18* | (2006.01) |
| *C09D 161/14* | (2006.01) |
| *C09D 161/12* | (2006.01) |
| *F16L 55/164* | (2006.01) |
| *E21B 41/02* | (2006.01) |
| *C09D 161/00* | (2006.01) |
| *C09D 5/08* | (2006.01) |
| *C09D 165/00* | (2006.01) |
| *E21B 17/00* | (2006.01) |
| *F16L 58/10* | (2006.01) |
| *F16L 55/1645* | (2006.01) |
| *F16L 101/16* | (2006.01) |

(52) U.S. Cl.
CPC ............. *C09D 161/06* (2013.01); *B05D 3/10* (2013.01); *B05D 3/102* (2013.01); *B05D 3/107* (2013.01); *B05D 3/108* (2013.01); *B05D 7/222* (2013.01); *C09D 5/08* (2013.01); *C09D 161/00* (2013.01); *C09D 161/02* (2013.01); *C09D 161/04* (2013.01); *C09D 161/12* (2013.01); *C09D 161/14* (2013.01); *C09D 161/16* (2013.01); *C09D 161/18* (2013.01); *C09D 161/34* (2013.01); *C09D 165/00* (2013.01); *E21B 17/00* (2013.01); *E21B 41/02* (2013.01); *F16L 55/164* (2013.01); *F16L 57/00* (2013.01); *F16L 58/10* (2013.01); *B05D 2202/00* (2013.01); *B05D 2254/00* (2013.01); *B05D 2254/04* (2013.01); *C08G 2261/344* (2013.01); *F16L 55/1645* (2013.01); *F16L 58/1009* (2013.01); *F16L 2101/16* (2013.01)

(58) Field of Classification Search
CPC .......... B05D 3/10; B05D 3/102; B05D 3/107; B05D 3/108; B05D 7/222; B05D 2202/00; B05D 2254/00; B05D 2254/04; F16L 157/00; C09D 161/00; C09D 161/02; C09D 161/04; C09D 161/06; C09D 161/12; C09D 161/14; C09D 161/16; C09D 161/18; C09D 161/34
USPC .................................. 427/230–239; 138/145
See application file for complete search history.

(56) References Cited

U.S. PATENT DOCUMENTS

| 3,974,306 | A | * | 8/1976 | Inamura | .................. | B05D 7/222 |
| | | | | | | 118/306 |
| 4,435,472 | A | | 3/1984 | Leah | | |
| 2008/0299473 | A1 | * | 12/2008 | Inagaki | ................ | G03G 5/0507 |
| | | | | | | 430/58.05 |
| 2014/0373965 | A1 | * | 12/2014 | Leist | ........................ | C08K 3/38 |
| | | | | | | 138/145 |
| 2015/0051331 | A1 | | 2/2015 | Kobayashi et al. | | |

FOREIGN PATENT DOCUMENTS

| CA | 2111322 A1 | 6/1994 |
| EP | 0 759 497 A2 | 2/1997 |
| JP | 52-78250 A | 7/1977 |
| JP | 54-11938 A | 1/1979 |
| JP | 55-75767 A | 6/1980 |
| JP | 56-11930 U | 1/1981 |
| JP | 58-128593 A | 8/1983 |
| JP | 59-39370 A | 3/1984 |
| JP | 59-102960 A | 6/1984 |
| JP | 60-28860 A | 2/1985 |

(Continued)

OTHER PUBLICATIONS

International Search Report dated Apr. 21, 2015, issued in counterpart International Application No. PCT/JP2015/050309 (4 pages).

(Continued)

*Primary Examiner* — William Phillip Fletcher, III
(74) *Attorney, Agent, or Firm* — Westerman, Hattori, Daniels & Adrian, LLP

(57) ABSTRACT

In the coating method, a pipe for transporting oil and/or gas mined from underground is provided. An acid curable resin is passed through the pipe to adhere the acid curable resin to at least a part of an inner wall of the pipe. Then, an acid curing agent is passed through the pipe to allow the acid curing agent to make contact with the acid curable resin such that the acid curable resin is cured.

8 Claims, 3 Drawing Sheets

(56) References Cited

FOREIGN PATENT DOCUMENTS

| | | | |
|---|---|---|---|
| JP | 6-322103 A | 11/1994 |
| JP | 9-60770 A | 3/1997 |
| JP | 11-269340 A | 10/1999 |
| JP | 2002-12736 A | 1/2002 |
| JP | 2007-209957 A | 8/2007 |
| JP | 2013-91077 A | 5/2013 |
| WO | WO 2013/130360 A1 * | 9/2013 |
| WO | 2013/146534 A1 | 10/2013 |
| WO | WO 2013/146534 A1 * | 10/2013 |

OTHER PUBLICATIONS

English concise explanation of Tomoe et al., "Recent problem about corrosion and anti-corrosion in petroleum development", petroleum and natural gas review, Jul. 2009, vol. 43 No. 4, pp. 73-87, cited in Specification (1 page).

Tomoe et al., "Recent problem about corrosion and anti-corrosion in petroleum development", petroleum and natural gas review, Jul. 2009, vol. 43 No. 4, pp. 73-87, cited in Specification (15 pages).

* cited by examiner

METHOD FOR COATING PIPE WITH ACID-CURABLE RESIN AND ACID CURING AGENT

TECHNICAL FIELD

The present invention relates to a coating material and a coating method.

RELATED ART

Oil and/or gas (a fluid) buried in an underground layer such as an oily and/or gaseous hydrocarbon is recovered through a pipeline. At that time, an inner wall of a pipe constituting the pipeline is corroded by corrosive components contained in the oil and/or gas. Therefore, in the case where the corrosion of the pipe proceeds by long-term use, and thus the pipe is damaged, the oil and/or gas may leak from the pipe. This causes not only productivity decrease thereof, but also dangers such as surrounding environment pollution and explosion due to outflow of chemicals.

In order to prevent the corrosion of the inner wall of the pipe, for example, taken is a procedure of coating a corrosion prevention agent onto the inner wall of the pipe to form a coating film thereon or the like (for example, see Non-Patent Document 1).

However, since the coating film made of the corrosion prevention agent is formed on only the outermost surface of the inner wall of the pipe, it is deteriorated over time to decrease a corrosion prevention effect thereof. For this reason, maintenance such as recoating of the corrosion prevention agent onto the inner wall of the pipe is once required for one to two months. In addition, since it is necessary to stop the production of the oil and/or gas during the maintenance, there is a problem in that the productivity thereof is decreased.

Further, in order to reduce the corrosion of the pipe, the mined oil is often recovered after the corrosion prevention agent is continuously added thereto. However, there is another problem in that such a procedure becomes very expensive.

Therefore, requested is to develop a coating material which has a high corrosion prevention effect (an anti-corrosive effect), and can extend a time required for carrying out maintenance due to aged deterioration thereof.

PRIOR ART DOCUMENT

Patent Document

Non-patent document 1: Tomoe et al., "Recent problem about corrosion and anti-corrosion in petroleum development", petroleum and natural gas review, 2009.7, Vol. 43 No. 4, p 73-p 87

SUMMARY OF THE INVENTION

Problem to be Solved by the Invention

It is an object of the present invention to provide a coating material for coating an inner wall of a pipe for transporting oil and/or gas mined from underground to prevent corrosion of the inner wall of the pipe by a high anti-corrosion effect thereof, and a coating method for coating the inner wall of the pipe with a cured product of the coating material.

Means for Solving Problem

In order to achieve the object, the present invention includes the following features (1) to (10).

(1) A coating material for coating at least a part of an inner wall of a pipe for transporting oil and/or gas mined from underground, comprising:
an acid curing agent; and
an acid curable resin to be cured by the acid curing agent.

(2) The coating material according to the above feature (1), wherein the acid curing agent contains at least one selected from the group consisting of hydrochloric acid, sulfuric acid, nitric acid, phosphoric acid, lactic acid, maleic acid, benzoic acid, fluoroacetic acid, methane sulfonic acid, p-toluene sulfonic acid, benzene sulfonic acid, dodecyl benzene sulfonic acid, phenol sulfonic acid, naphthalene sulfonic acid, dinonyl naphthalene sulfonic acid and dinonyl naphthalene disulfonic acid.

(3) The coating material according to the above feature (1) or (2), wherein the acid curable resin contains at least one selected from the group consisting of a furan resin and a phenol resin.

(4) A coating method in which the coating material defined by any one of the above features (1) to (3) is passed through a pipe for transporting oil and/or gas rained from underground to coat at least a part of an inner wall of the pipe with a cured product of the acid curable resin.

(5) The coating method according to the above feature (4), wherein the acid curable resin is passed through the pipe to adhere the acid curable resin to the at least a part of the inner wall of the pipe, and then the acid curing agent is passed through the pipe to allow the acid curing agent to make contact with the adhered acid curable resin so that the acid curable resin is cured.

(6) The coating method according to the above feature (5), wherein the acid curing agent is used as a liquid obtained by dissolving or diluting the acid curing agent in water and/or an organic solvent.

(7) The coating method according to the above feature (5) or (6), wherein the acid curable resin and the acid curing agent are brought into a state of being separated from each other inside the pipe using a partition wall member, and the acid curing agent is passed through the pipe so as to follow the acid curable resin in the state.

(8) The coating method according to the above feature (7), wherein an overall shape of the partition wall member is formed into a columnar shape having a profile corresponding to an inner shape of the pipe.

(9) The coating method according to the above feature (8), wherein the partition wall member has a central portion in the middle of a longitudinal direction thereof, an average cross-sectional area of the central portion is smaller than an average cross-sectional area of a portion other than the central portion.

(10) The coating method according to the above feature (9), wherein the partition wall member has at least one flange portion protruded laterally from the central portion.

Effects of the Invention

According to the present invention, it is possible to efficiently coat a coating material having corrosion resistance onto an inner wall of a pipe, and to prevent a corrosive gas from making contact with the pipe by a cured product of the coated coating material. This makes it possible to accurately suppress or prevent corrosion of the inner wall of the pipe for a long period of time. Further, it is possible to reduce the frequency of maintenance of the pipe by a long-term corrosion prevention effect. This makes it possible to enhance productivity of oil and/or gas.

MODE FOR CARRYING OUT THE INVENTION

Hereinafter, preferred embodiments of a coating material and a coating method according to the present invention will be described in detail with reference to the accompanying drawings.

Figure 1:
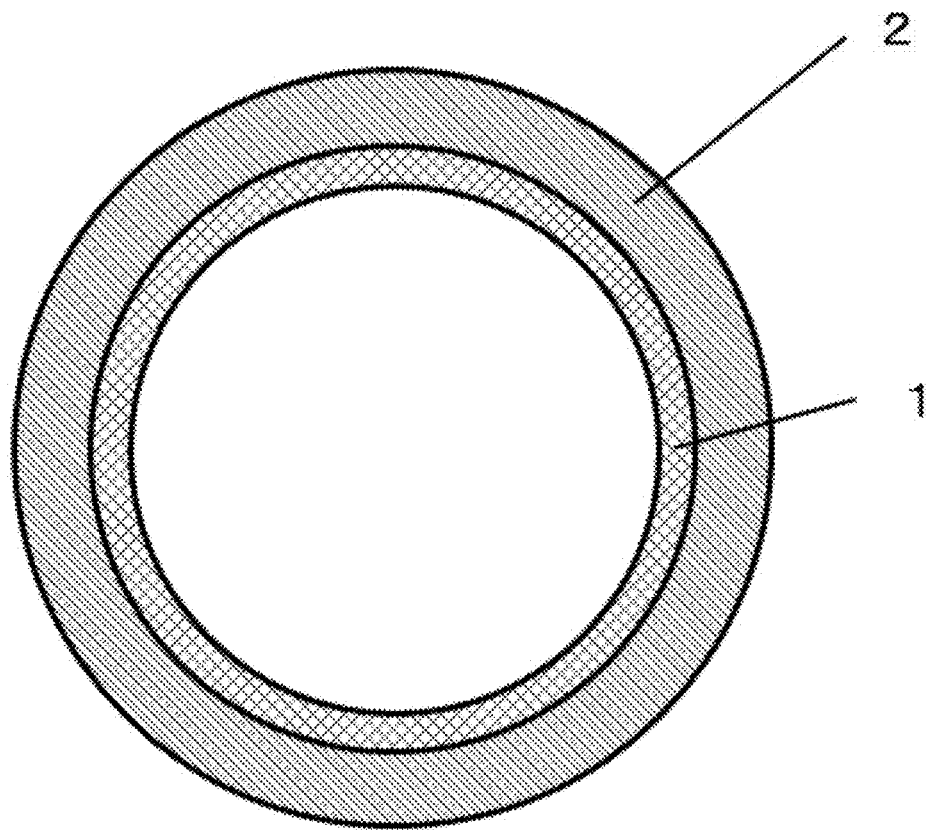
FIG. 1 is a cross-sectional view showing an embodiment of a pipe whose inner wall is coated with a cured product of a coating material according to the present invention.

FIG. 1 is a cross-sectional view showing an embodiment of a pipe whose inner wall is coated with a cured product of the coating material according to the present invention.

The coating material of the present invention is used for coating at least a part of an inner wall of a pipe for transporting oil and/or gas mined from underground. The coating material is characterized by containing an acid curing agent and an acid curable resin to be cured by the acid curing agent. This makes it possible to block a corrosive gas contained in the oil and/or gas from making contact with the pipe, thereby preventing corrosion of the pipe for a long period of time.

As shown in FIG. 1, at least a part of an inner wall surface (in this embodiment, an entire circumference of the inner wall surface) of a pipe 2 is coated with the coating material 1. The coating material 1 is cured after being coated onto the inner wall surface of the pipe 2, and thus a cured product (a cured coating film) thereof functions as a protective layer of the inner wall surface of the pipe 2.

Various kinds of pipes each having enough mechanical strength to withstand a pressure, which would be generated when the oil and/or gas is passed therethrough, are suitable for the pipe 2, but it is not limited to a specific type. Specific examples of the pipe 2 include a carbon steel pipe, a SUS steel pipe and the like. In this regard, a shape of the pipe 2 may be either a circle-tubular shape or a corner-tubular shape, but is preferably the circle-tubular shape. An average inner diameter of the pipe 2 having the circle-tubular shape is not limited to a specific value, but is preferably in the range of about 0.01 to 20 m.

Figure 2:
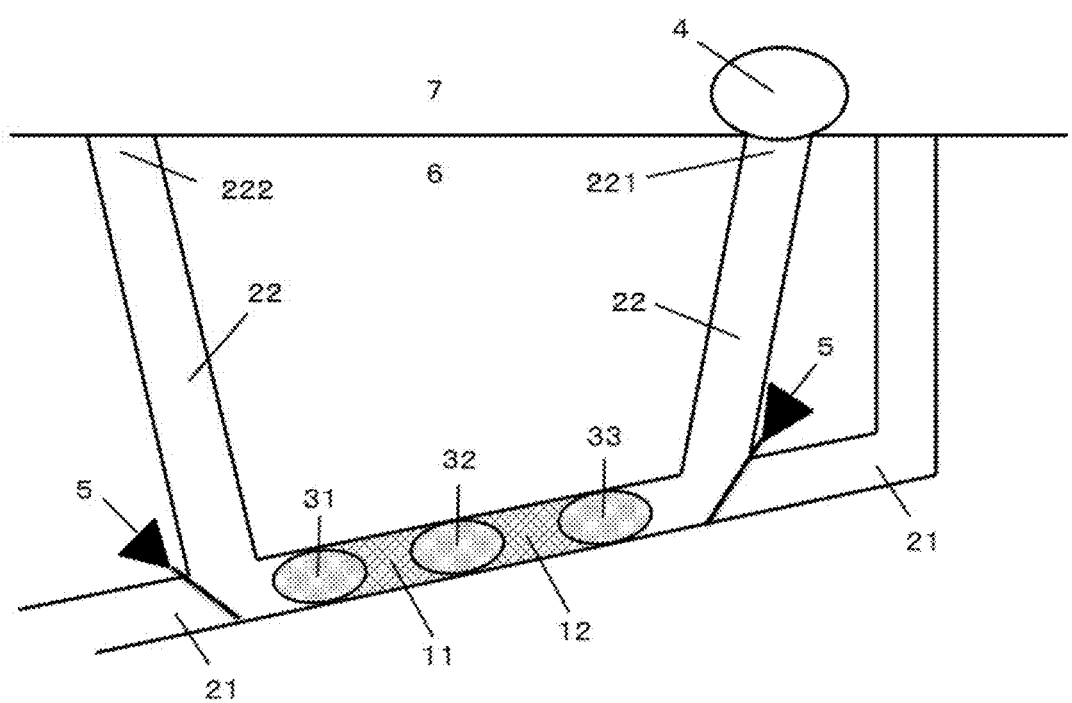
FIG. 2 is a conceptual view for explaining one example of a method for coating the coating material onto the inner wall of the pipe.

FIG. 2 is a conceptual view for explaining one example of a method for coating the coating material 1 onto the inner wall of the pipe 2 constituting a pipeline 21. In the method shown in FIG. 2, the coating material 1 is coated onto the inner wall of the pipe 2 constituting the pipeline 21 through the following processes.

The pipeline 21 is a pipeline for transporting oil and/or gas mined from underground 6, and is constructed by connecting a plurality of the pipes 2 to each other. Two maintenance pipes 22 are connected to this pipeline 21 in the middle thereof. In one of the maintenance pipes 22, one end thereof is connected to the pipeline 21, and the other end thereof is open to ground 7 at a maintenance pipe inlet 221. In the other maintenance pipe 22, one end thereof is connected to the pipeline 21, and the other end thereof is open to the ground 7 at a maintenance pipe outlet 222.

Further, a switching valve 5 is provided at a connection portion between each maintenance pipe 22 and the pipeline 21. The switching valve 5 can switch a communicating state allowing each maintenance pipe 22 to communicate with the pipeline 21 and a non-communicating state not allowing each maintenance pipe 22 to communicate with the pipeline 21.

[1] First, each switching valve 5 is brought into the communicating state. In this state, a dedicated jig (a partition wall member) 31 is inserted into the maintenance pipe 22 from the maintenance pipe inlet 221 on the ground 7, and then the acid curable resin 11 of the coating material 1 is supplied into the maintenance pipe 22.

[2] Next, a dedicated jig 32 is inserted into the maintenance pipe 22 from the maintenance pipe inlet 221 to form a liquid pool constituted from the acid curable resin 11 of the coating material 1 between the dedicated jig 31 and the dedicated jig 32.

[3] Thereafter, a solution containing the acid curing agent of the coating material 1 (hereinafter, also referred to as an "acid curing agent solution") 12 is supplied into the maintenance pipe 22 from the maintenance pipe inlet 221, and then the dedicated jig 33 is inserted into the maintenance pipe 22. In this way, a liquid pool constituted from the acid curing agent solution 12 of the coating material 1 is formed between the dedicated jig 32 and the dedicated jig 33.

[4] Next, a fluid such as water or an organic solvent is supplied into the maintenance pipe 22 from the maintenance pipe inlet 221 using a pump or the like to apply a pressure to the dedicated jig 33 from the rear side thereof. In this way, the dedicated jigs 31, the liquid pool of the acid curable resin 11, the dedicated jig 32, the liquid pool of the acid curing agent solution 12, the dedicated jig 33 and the fluid are continuously passed through the pipeline 21.

At this time, a gap is formed between at least a part of the dedicated jig 32 and the inner wall of the pipe 2 constituting the pipeline 21, and thus the acid curable resin 11 is left (adhered) onto the inner wall surface of the pipe 2 of the pipeline 21 through the gap. This makes it possible to coat the inner wall of the pipe 2 with the acid curable resin 11. Thereafter, the acid curing agent solution 12 makes contact with the acid curable resin 11 adhered on the inner wall of the pipe 2 to care the acid curable resin 11 (the coating material 1). That is, the inner wall of the pipe 2 constituting the pipeline 21 is coated with the cured product of the acid curable resin 11 (the coating material 1).

[5] Next, a dedicated jig 3 (hereinafter, the dedicated jigs 31 to 33 are collectively referred to as a "dedicated jig 3" on occasion), and the excess acid curable resin 11 and acid curing agent solution 12 are recovered from the maintenance pipe exit 222 through the maintenance pipe 22. Thereafter, each switching valve 5 is brought into the non-communicating state.

In this regard, in the present invention, the acid curable resin 11 has only to coat the inner wall of the pipe 2 constituting the pipeline 21, and then make contact with the acid curing agent solution 12. Therefore, a shape (configuration) and/or the number of the dedicated jig 3 to be used are not limited thereto. The configuration of the dedicated jig 3 will be described in detail below.

Further, as described above, in the method shown in FIG. 2, the acid curable resin 11 and acid curing agent solution 12 of the coating material 1 are brought into a state of being separated from each other by the dedicated jig 32 without being mixed with each other, and the acid curing agent solution 12 is passed through the pipeline 21 so as to follow the acid curable resin 11 in the above state. However, in the present invention, the method for coating the coating material 1 onto the inner wall of the pipe 2 constituting the pipeline 21 is not limited thereto.

For example, the acid curable resin 11 may be passed through the pipeline 21 and recovered, and then the acid curing agent solution 12 may be passed through the pipeline 21. Further, just before the acid curable resin 11 and the acid curing agent solution 12 are supplied into the maintenance pipe 22, they may be mixed with each other to prepare a mixture (a resin composition), and then such a mixture may be supplied into the maintenance pipe 22.

According to the present invention, by a simple method in which the coating material 1 (the acid curable resin 11 and the acid curing agent or the acid curing agent solution 12) is passed through the pipeline 21, it is possible to reliably coat the inner wall of the pipe 2 constituting the pipeline 21 with the cured coating film made of the acid curable resin 11 (the coating material 1) and having long-term corrosion resistance.

In this regard, in the case where the liquid pool of the acid curable resin 11 and the liquid pool of the acid curing agent solution 12 are formed inside the pipeline 21 using the dedicated jig 3 like the method shown in FIG. 2, it is possible to reduce the used amounts thereof. Further, since the acid curable resin 11 and the acid curing agent solution 12 do not make contact with each other before being supplied into the maintenance pipe 22, it is also possible to appropriately prevent the acid curable resin 11 from being cured at an unrequired place.

Here, the dedicated jig 3 may have any non-limited shape as long as it has a shape which is movable inside the pipeline 21 and able to coat the inner wall of the pipe 2 constituting the pipeline 21 with the coating material 1. For example, a pig having a longitudinal sectional view shown in FIG. 3 or the like can be preferably used. Hereinafter, the dedicated jig 3 shown in FIG. 3 will be described.

Figure 3:
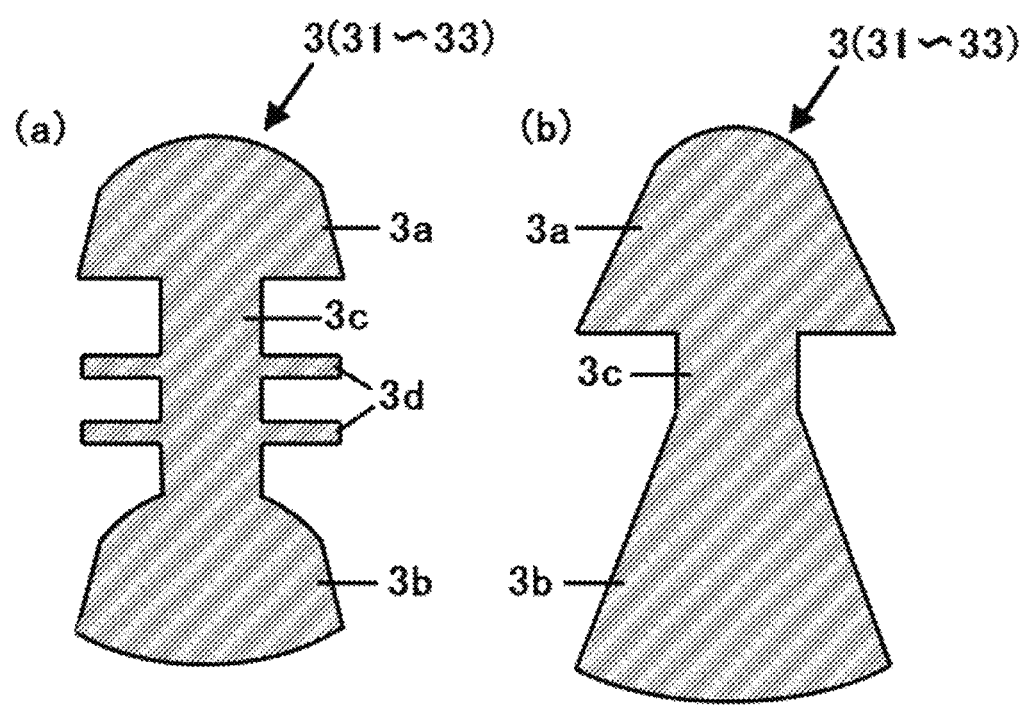
FIG. 3 is a longitudinal sectional view of a pig, which is a specific example of a dedicated jig used in coating the coating material onto the inner wall of the pipe.

An overall shape of the dedicated jig 3 is formed into a columnar shape having a profile corresponding to an inner shape of the pipe 2. In this embodiment, the inner shape of the pipe 2 is formed into a circular shape, and thus the overall shape of the dedicated jig 3 shown in FIG. 3 is formed into a cylindrical shape. Further, the dedicated jig 3 has a distal end portion 3a, a proximal end portion 3b and a connecting portion (a central portion) 3c provided between the distal end portion 3a and the proximal end portion 3b and connecting them together.

A cross-sectional area of each of the distal end portion 3a and the proximal end portion 3b is increased toward the proximal end from the distal end thereof. In particular, each of the distal end portion 3a and proximal end portion 3b shown in FIG. 3(a) and the distal end portion 3a shown in FIG. 3(b) is formed into a shape whose increase ratio of cross-sectional area is decreased in the middle of a longitudinal direction thereof (a bowl shape or a shell shape). On the other hand, the proximal end portion 3b shown in FIG. 3(b) has a shape whose increase ratio of cross-sectional area is substantially constant (a truncated cone shape).

A maximum cross-sectional area (a maximum diameter) of each of the distal end portion 3a and the proximal end portion 3b is set to be slightly smaller than a minimum cross-sectional area of a lumen of each of the pipe 2 and the maintenance pipe 22 (a minimum inner diameter of the pipe 2 and the maintenance pipe 22). Further, an average cross-sectional area (an average diameter) of the connecting portion 3c is set to be smaller than an average cross-sectional area (a mean diameter) of each of the distal end portion 3a and the proximal end portion 3b (a portion other than the connection portion 3c).

With the configuration described above, it is possible to smoothly pass the dedicated jig 3 through the pipe 2 constituting the pipeline 21 and the maintenance pipe 22. Further, as described in the step [4], the gap is formed between the at least a part of the dedicated jig 32 and the inner wall of the pipe 2 constituting the pipeline 21.

Further, in the dedicated jig 3 shown in FIG. 3(a), at least one ("two" in the illustrated configuration) annular flange portions 3d each protruded laterally from the connecting portion 3c are formed. A maximum cross-sectional area (a maximum diameter) of the connecting portion 3c at each flange portion 3d is set to be substantially equal to the maximum cross-sectional area (the maximum diameter) of each of the distal portion 3a and the proximal portion 3b. This makes it possible to improve mechanical strength of the connecting portion 3c, while preventing sliding resistance of the dedicated jig 3 with respect to the pipe 2 constituting the pipeline 21 and the maintenance pipe 22 from being increased.

Examples of a constituent material of the dedicated jig 3 include, but are not particularly limited to, an epoxy resin, a phenol resin, a urea resin, a melamine resin, and the like. Further, a surface of the dedicated jig 3 may be subjected to a treatment for reducing the sliding resistance with respect to the pipe 2 constituting the pipeline 21 and the maintenance pipe 22. Examples of such a treatment include formation of a film made of a fluorine-based resin or a silicone-based resin, a surface treatment by embossing, and the like.

Next, description will be made on the coating material 1 of the present invention. The coating material 1 of the present invention is characterized by containing the acid curing agent, preferably the acid curing agent solution 12, and the acid curable resin 11 to be cured by the acid curing agent.

Examples of the acid curable resin 11 include, but are not particularly limited to, a furan resin, a phenol resins, a melamine resin, a urea resin, an oxetane resin, and the like. One of them can be used or two or more of them can be used in combination. Among them, the acid curable resin 11 preferably contains at least one selected from the group consisting of the furan resin and the phenol resin. Since various kinds of such an acid curable resin are readily cured at a temperature of about room temperature in the presence of an acid such as the acid curing agent (an acidic group of the acid curing agent), they are suitable for use, in particular, in the present invention.

Further, the use of these resins makes it possible to enhance the anti-corrosive effect of the cured product (the cured coating film) made of the acid curable resin 11 against the pipe 2. Furthermore, since the cured product (the cured coating film) made of such an acid curable resin 11 has excellent corrosion resistance against the corrosive gas, it is possible to accurately suppress or prevent the corrosion of the inner wall of the pipe 2 for a long period of time. This makes it possible to reduce the frequency of maintenance of the pipe 2 by a long-term corrosion prevention effect to thereby enhance productivity of the oil and/or gas.

Examples of the furan resin include a furfural resin, a furfural phenol resin, a furfural ketone resin, a furfuryl alcohol resin, a furfuryl alcohol phenol resin, and the like.

Examples of the phenol resin include a resol type phenol resin, an alkylene-etherified resol type phenol resin, a dimethylene ether type phenol resin, an aminomethyl type phenol resin, a novolac type phenol resin, an aralkyl type phenol resin, a dicyclopentadiene type phenol resin, and the like.

Further, such an acid curable resin 11 may be used by being dissolved or diluted in water or an organic solvent to lower viscosity thereof. Thus, in the method shown in FIG. 2, when the dedicated jig (e.g., the pig) 3, the liquid pool of the acid curable resin 11 and the liquid pool of the acid curing agent solution 12 are passed through the pipeline 21 by the pressure of the fluid using the pump or the like, it is possible to raise a passing speed thereof. This makes it possible to more efficiently coat the inner wall of the pipe 2 constituting the pipeline 21 with the coating material 1.

The acid curing agent solution 12 is a solution containing the acid curing agent, specifically, a solution obtained by dissolving or diluting the acid curing agent in a solvent. The acid curing agent may be any agent as long as it can exhibit a catalytic function for curing the acid curable resin.

Concrete examples of such an acid curing agent include: a curing agent having a sulfonic acid group as an acidic group such as sulfuric acid, p-toluene sulfonic acid, benzene sulfonic acid, dodecyl benzene sulfonic acid, phenol sulfonic acid, naphthalene sulfonic acid, dinonyl naphthalene sulfonic acid, dinonyl naphthalene disulfonic acid, xylene sulfonic acid and methane sulfonic acid; a curing agent having a carboxyl group as the acidic group such as acetic acid, lactic acid, maleic acid, benzoic acid and fluoroacetic acid; hydrochloric acid; phosphoric acid; nitric acid; nitrous acid; and the like. One of them can be used or two or more of them can be used in combination.

Among them, the acid curing agent is preferably the curing agent having the sulfonic acid group as the acidic group. Such a curing agent having the sulfonic acid group as the acidic group is a very good catalyst for the acid curable resin 11.

As the solvent used for dissolving or diluting the acid curing agent, a solvent having high compatibility with the acid curing agent is preferable. Examples of such a solvent include: water; organic solvents such as an alcohol-based solvent (e.g., methanol, ethanol or propanol), a ketone-based solvent (e.g., acetone or methyl ethyl ketone), an ester-based solvent (e.g., methyl acetate or ethyl acetate), toluene and xylene; and the like. In this regard, as the solvent, one of the water and the organic solvents can be used or two or more of them can be used in combination.

The coating material 1 may contain components other than the acid curable resin 11 and the acid curing agent or the acid curing agent solution 12.

Examples of such components include a lubricant (wax), a coupling agent, a reinforcing agent, and the like. For example, the lubricant has a function of improving conformability of the coating material 1 to the inner wall of the pipe 2, and the coupling agent has a function of improving adhesion of the coating material 1 to the inner wall of the pipe 2.

Examples of the lubricant include ethylene bisstearic acid amide, methylene bisstearic acid amide, oxystearic acid amide, stearic acid amide, methylol stearic acid amide, hydrocarbon wax, stearic acid, and the like. On the other hand, examples of the coupling agent include a silane coupling agent such as aminosilane, epoxysilane or vinyl silane, a titanate coupling agent, and the like.

EXAMPLES

Hereinafter, more detailed description will be made on the present invention with reference to examples thereof.

Manufacture of Test Pieces

Example 1

A furan resin ("FR-16475" produced by Sumitomo Bakelite Co., Ltd.) as an acid curable resin and iron plates were prepared, and then one surface of each iron plate made contact with a liquid surface of the furan resin. In this way, a coating film made of the furan resin and having a thickness of 13 μm was formed on the one surface of each iron plate. Next, a 10 wt % p-toluene sulfonic acid aqueous solution was prepared as an acid curing agent solution, and then each iron plate in which the coating film made of the furan resin was formed on the one surface thereof was dipped into the p-toluene sulfonic acid aqueous solution for 10 seconds. Thereafter, the coating film made of the furan resin was cured at room temperature for 12 hours to obtain iron plates each coated with the cured coating film made of the furan resin. Such iron plates were used as test pieces.

Example 2

The coating operation was carried out in the same manner as Example 1 except that a resol type phenol resin ("PC-25" produced by Sumitomo Bakelite Co., Ltd.) was used instead of the furan resin as the acid curable resin to obtain iron plates each coated with a cured coating film made of the resol type phenol resin. Such iron plates were used as test pieces.

Example 3

The coating operation was carried out in the same manner as Example 1 except that a resol type phenol resin ("PR-51723" produced by Sumitomo Bakelite Co., Ltd.) was used instead of the furan resin as the acid curable resin to obtain iron plates each coated with a cured coating film made of the resol type phenol resin. Such iron plates were used as test pieces.

Comparative Example 1

Iron plates were directly used as test pieces without carrying out the coating operation.

Comparative Example 2

A solution containing a novolac epoxy resin composition ("Plasite 4550S" produced by Carboline Company) used for coating an inner surface of a tank as a corrosion prevention agent was prepared, and then it was applied onto one surface of each iron plate to form a coating film made of the novolac type epoxy resin composition thereon. Thereafter, the coating film is cured to obtain iron plates each coated with a cured coating film made of the novolac epoxy resin. Such iron plates were used as test pieces.

Evaluation Method

Corrosion resistance evaluation: The test pieces of each of Examples and Comparative Examples were, respectively, dipped into a corrosion treatment liquid 1 containing 2 mass % of calcium chloride, 8 mass % of sodium chloride and 90 mass % of water; or a corrosion treatment liquid 2 containing 2 mass % of calcium chloride, 8 mass % of sodium chloride, 0.4 mass % of sulfuric acid and 89.6 mass % of water at 80° C. for 24 hours. Thereafter, the surface (in each of examples and Comparative example 2, the coated surface) of each iron plate was visually observed, and then presence or absence of corrosion thereon was determined.

The surface of each test piece of Examples 1 to 3 and Comparative Example 2 was not corroded by any treatments of the corrosive treatment liquids 1 and 2. On the other hand, a part of the surface of each test piece of Comparative Example 1 was corroded by both treatments of the corrosion treatment solutions 1 and 2. From these results, it became apparent that each test piece of Examples and Comparative Example 2 had higher anti-corrosion effect than each test piece of Comparative Example 1.

In this regard, in the case where the same evaluation as described above was carried out by extending the time when the test pieces of Examples 1 to 3 and Comparative Example 2 were dipped into the corrosion treatment liquids 1 and 2, the surface corrosion began at the early stage in each test piece of Comparative Example 2 as compared with each test piece of examples 1 to 3. From these results, it became apparent that each cured coating film of Examples had excellent long-term corrosion resistance.

INDUSTRIAL APPLICABILITY

According to the present invention, it is possible to efficiently coat a coating material having corrosion resistance onto an inner wall of a pipe, and to prevent a corrosive gas from making contact with the pipe by a cured product of the coated coating material. This makes it possible to accurately suppress or prevent corrosion of the inner wall of the pipe for a long period of time. Further, it is possible to reduce the frequency of maintenance of the pipe by a long-term corrosion prevention effect. Therefore, the coating material and the coating method of the present invention can be suitably used for coating the inner wall of the pipe for transporting oil and/or gas mined from underground. Accordingly, the present invention has industrial applicability.

EXPLANATIONS OF LETTERS OR NUMERALS

1 Resin composition
11 Acid curable resin
12 Acid curing agent solution
2 Pipe
21 Pipeline
22 Maintenance pipe
221 Maintenance pipe inlet
222 Maintenance pipe outlet
3 Dedicated jig
31 Dedicated jig
32 Dedicated jig
33 Dedicated jig
4 Pump
5 Switching valve
6 Underground
7 Ground

What is claimed is:

1. A coating method, comprising:
providing a pipe for transporting oil and/or gas mined from underground;
passing an acid curable resin through the pipe to adhere the acid curable resin to at least a part of an inner wall of the pipe; and
passing an acid curing agent through the pipe to allow the acid curing agent to make contact with the acid curable resin such that the acid curable resin is cured.

2. The method as claimed in claim 1, wherein the acid curing agent contains at least one selected from the group consisting of hydrochloric acid, sulfuric acid, nitric acid, phosphoric acid, lactic acid, maleic acid, benzoic acid, fluoroacetic acid, methane sulfonic acid, p-toluene sulfonic acid, benzene sulfonic acid, dodecyl benzene sulfonic acid, phenol sulfonic acid, naphthalene sulfonic acid, dinonyl naphthalene sulfonic acid and dinonyl naphthalene disulfonic acid.

3. The method as claimed in claim 1, wherein the acid curable resin contains at least one selected from the group consisting of a furan resin and a phenol resin.

4. The coating method as claimed in claim 1, wherein the acid curing agent is provided as a liquid state in which the acid curing agent is dissolved in or diluted with water and/or an organic solvent.

5. The coating method as claimed in claim 1, further comprising:
inserting a first partition member before passing the acid curable resin through the pipe;
inserting a second partition member after passing the acid curable resin through the pipe but before passing the acid curing agent through the pipe such that a gap is formed between the inner wall of the pipe and the second partition member;
inserting a third partition member after passing the acid curing agent through the pipe, wherein a first liquid pool of the acid curable resin is formed between the first partition member and the second partition member, wherein a second liquid pool of the acid curing agent is formed between the second partition member and the third partition member,
moving the first partition member, the second partition member and the third partition member such that the second liquid pool follows the first liquid pool.

6. The coating method as claimed in claim 5, wherein an overall shape of the partition wall member is formed into a columnar shape having a profile corresponding to an inner shape of the pipe.

7. The coating method as claimed in claim 6, wherein the partition wall member has a central portion in the middle of a longitudinal direction thereof, an average cross-sectional area of the central portion is smaller than an average cross-sectional area of a portion other than the central portion.

8. The coating method as claimed in claim 7, wherein the partition wall member has at least one flange portion protruded laterally from the central portion.

* * * * *